(12) United States Patent
Ries

(10) Patent No.: US 7,814,615 B1
(45) Date of Patent: Oct. 19, 2010

(54) BLOWER ATTACHMENT FOR RAKING DEBRIS

(76) Inventor: Timothy J. Ries, 3312 SW. Meyer Blvd., Blue Springs, MO (US) 64015

( * ) Notice: Subject to any disclaimer, the term of this patent is extended or adjusted under 35 U.S.C. 154(b) by 862 days.

(21) Appl. No.: 11/784,728

(22) Filed: Apr. 9, 2007

(51) Int. Cl.
*A47L 9/08* (2006.01)

(52) U.S. Cl. ............... 15/405; 15/327.5; 15/344; 15/415

(58) Field of Classification Search ........... 15/327.5, 15/344, 415.1, 405; *A47L 9/08*
See application file for complete search history.

(56) References Cited

U.S. PATENT DOCUMENTS

| | | | |
|---|---|---|---|
| 4,402,106 A | 9/1983 | Mattson | |
| 4,404,705 A * | 9/1983 | Thoma | 15/313 |
| D382,683 S | 8/1997 | Henke et al. | |
| 5,768,748 A | 6/1998 | Silvera et al. | |
| 5,991,973 A | 11/1999 | Simpson | |
| D460,842 S | 7/2002 | Sainsbury | |
| 6,494,514 B1 | 12/2002 | Stinnett et al. | |

* cited by examiner

*Primary Examiner*—David A Redding
(74) *Attorney, Agent, or Firm*—Richard L. Marsh

(57) ABSTRACT

A raking attachment for an air stream generating device is adapted to direct an air stream generated by air stream generating device into a loosely defined plane. The raking attachment comprises a generally triangular shaped top wall, an opposing triangular shaped bottom face, side walls and an inlet throat with the side walls joined to at least a portion of the top wall and the bottom face wherein the top wall, bottom face and side walls extend longitudinally from the inlet throat. The top wall also extends beyond a terminal end of the bottom face and terminates in an end wall that is disposed at a angle relative to the top wall.

17 Claims, 4 Drawing Sheets

BLOWER ATTACHMENT FOR RAKING DEBRIS

BACKGROUND OF THE INVENTION

1. Field of the Invention

This invention relates to an attachment for a portable air blower to permit raking of debris away from a dislodged location in a direction generally toward the operator of the blower.

2. Prior Art Statement

Powered leaf blowers are useful tools and very widely used, however, they "push blow" leaves and other debris. One problem with current powered leaf blowers is the inability to dislodge leaves from under and between plants and bushes or along the bottom of building wall. Thus there exists a need for an attachment for a powered blower that will direct the blown air stream in a "raking" direction such that the blower is able to "pull blow" leaves and debris from buildings, bushes, shrubs and other plants.

It is known to provide an acute angle wand which will accept a single discharge port straight concentrator nozzle for cleaning out gutters though the debris is scattered as the concentrator nozzle produces considerable turbulence in an undirected stream. Such concentrator nozzles have been available with Poulan, Black & Decker and TroyBuilt blowers. For instance, see the U.S. Pat. No. 4,402,106 issued on 6 Sep. 1983, to Charles A. Mattson. A similar device with an articulated wand is shown in U.S. Design Pat. D460,842 S issued on 23 Jul. 2002 to Steven W., Sainsbury. It is readily apparent from the description and drawings that the single air stream is concentrated and directed at the acute angle of the attachment. An attachment for a portable air blower that spreads the air stream in an inwardly directed manner is desired in order to dislodge debris from objects and direct the debris into a form substantially toward the operator.

It is also known to provide a nozzle for an air discharge blower with three distinct ports disposed substantially straight or at a minor obtuse angle from the air stream generated by the blower, the air streams generally parallel from the ports. For instance, see the U.S. Design Pat. D 382,683 issued on 19 Aug. 1997 to Henke, et al. There is still a need an attachment for a portable air blower that has at least one nozzle that is disposed at an acute angle that directs the air stream in a fanned shape generally toward the operator.

It is further known to provide rake teeth disposed generally at a 90 degree angle from the direction of the air flow but the teeth are not in the air stream. The air stream is described as transversely diffusive to loosen the waste and blow it forward in the direction of the axis of the plenum. For instance, see U.S. Pat. No. 5,991,973 issued on 30 Nov. 1999 to Timothy A. Simpson. Thus, there is still a need for an attachment for an air blower that has a plurality of nozzles turned inwardly at the ends such that the air stream is converging and directed opposite the direction of air flow in the plenum. There is also a need for an attachment for an air blower that has a substantially planar air stream directed opposite the direction of air flow in the plenum.

Still another known device comprises a blower affixed to a manure fork which blows lighter material into the stall while cleaning the stall. The air is directed down the plenum and outwardly, however still at an obtuse angle to the direction of air flow. For instance, see the U.S. Pat. No. 6,494,514 B1 issued on 17 Dec. 2002 to Stinnett, et al. Stinnett does not teach a substantial angle for the discharge of the air flow and thus the device is not suitable for dislodging debris from its location and directing same substantially toward the operator.

Therefore, the need still exists for an attachment for a portable air blower that spreads the air stream in an inwardly directed manner in order to dislodge debris from objects and direct the debris into a form that can be controlled by the operator of the blower.

Finally, it is known to provide vacuum cleaners with toothed rakes or combs at the end of the nozzle which generally direct the air stream at an obtuse angle to the direction of air flow, the air stream directed inwardly as opposed to outwardly. For instance, see the U.S. Pat. No. 5,768,748 issued on 23 Jun. 1998 to Silvera, et al. There is a great need for an attachment for a portable air blower that has discharge ports angled relative to the discharge of the plenum, the downstream end of the plenum having rake teeth so that the air stream spreads outwardly from the blower into an inwardly directed air stream, the rake teeth combining with the air stream to dislodge debris from objects and direct the debris substantially toward the operator.

SUMMARY OF THE INVENTION

Since no current attachment for an air generating device is adapted to dislodge objects and direct the debris inwardly and backwardly toward the operator in a form that can be controlled by the operator, there is a need for such a device. Therefore, a principal aim of this invention is to provide a raking attachment for an air stream generating device adapted to direct an air stream generated by the air stream generating device into a plane, the raking attachment comprising a generally triangular shaped top wall, an opposing triangular shaped bottom face, side walls and an inlet throat wherein the side walls join at least a portion of the top wall to the bottom face. The top wall, the bottom face and the side walls extend longitudinally from the inlet throat, the top wall extending beyond a terminal end of the bottom face, the top wall terminating in an end wall, the end wall disposed at a angle relative to the top wall of the raking attachment.

An object of this invention is to provide an attachment for an air stream generating device comprises a plurality of nozzles for directing an air stream generated by the air stream generating device through a plenum affixed to the air stream generating device, the plurality of nozzles having separate discharge ports joined together at a common throat of the attachment, the throat of the attachment removably attached to a discharge end of the plenum, the plurality of nozzles projecting at different but converging angles relative to the common throat, the plurality of nozzles dividing the air stream into a plurality of air streams wherein the discharge ports of the nozzles of the plurality of nozzles are directed in a plane disposed at an acute angle relative to a longitudinal axis of the plenum of the air stream generating device. The air raking attachment may be separable from the plenum or may be integrally formed therewith.

A primary goal of this invention is to provide an attachment for a blower that adapts to the terminal discharge end of a powered leaf blower that will direct the blown air stream in a "raking" direction such that the blower is able to "pull blow" leaves and debris from buildings, bushes, shrubs and other plants.

A significant feature of this invention is to provide an attachment for a blower that has a handle removably affixed to an extension tube from the blower to allow the operator to maneuver the attachment such that the blower is able to "pull blow" leaves and debris from buildings, bushes, shrubs and other plants.

A main purpose of this invention is to provide an attachment for a blower extension tube that has a wide triangular nose terminating in a serrated edge.

A primary principle of this invention is to provide an attachment for a blower extension tube that has a wide triangular nose terminating in compound curved edge, the compound curved edge curved downwardly to divert an air stream towards the ground and curved transverse to the axis of the air stream to direct the air stream backwardly towards the operator.

Another significant feature of this invention is to provide a raking attachment for an air stream generating device wherein a compound curved end wall is comprised of a first arc disposed laterally with respect to axis of plenum and a second arc disposed downwardly from a top wall, the compound curved end wall directing air from air stream generating device into a curved plane. The first arc has an arc length of between 5 inches and 25 inches and the second arc is tangent to the top wall.

One aspect of this invention is to provide an attachment for an air stream generating device wherein the compound curved end wall has at least one protuberance extending from at least a portion of the arc length thereof, the protuberance constituting a rake tooth.

Another goal of this invention is to provide a raking attachment for an air stream generating device that has a handle detachably disposed on a surface of plenum of the raking attachment that is generally disposed opposite a bottom face of the raking attachment.

Another aim of this invention is to provide a raking attachment for an air stream generating device wherein an inlet throat is extended along a longitudinal axis of the raking attachment, the extension of inlet throat having a substantially constant cross section thus constituting a plenum.

Another object of this invention is to provide a raking attachment for an air stream generating device having an extended plenum wherein a handle is integrally formed with the plenum on a surface of the plenum substantially opposite a bottom face of the raking attachment.

Still another feature of this invention is to provide a raking attachment for an air stream generating device wherein an inlet throat is telescopically received onto a tapered end of a plenum extending from the air stream generating device, the plenum having a substantially constant circular cross section.

A primary aspect of this invention is to provide an attachment for an air stream generating device wherein discharge ports of nozzles are disposed on an arc having a center point on a longitudinal axis of plenum.

Another aspect of this invention is to provide an attachment for an air stream generating device wherein discharge ports of nozzles have a protuberance extending from at least a portion of the periphery thereof, the protuberance constituting a raking tooth.

DESCRIPTION OF THE PREFERRED EMBODIMENTS

While the various features of this invention are hereinafter described and illustrated as an attachment for an air stream generating device comprises a plurality of nozzles for directing an air stream generated by the air stream generating device, the air stream directed through a plenum affixed to the air stream generating device, the plurality of nozzles having separate discharge ports, the plurality of nozzles joined together at a common throat of the attachment, the throat of the attachment removably attached to a discharge end of the plenum, the plurality of nozzles projecting at different but converging angles relative to the common throat, the plurality of nozzles dividing the air stream into a plurality of air streams wherein the discharge ports of the nozzles of the plurality of nozzles are directed in a plane disposed at an angle relative to a longitudinal axis of the plenum of the air stream generating device, it is to be understood that the various features of this invention can be used singly or in various combinations thereof an attachment for an air stream generating device as can hereinafter be appreciated from a reading of the following description.

Figure 1:
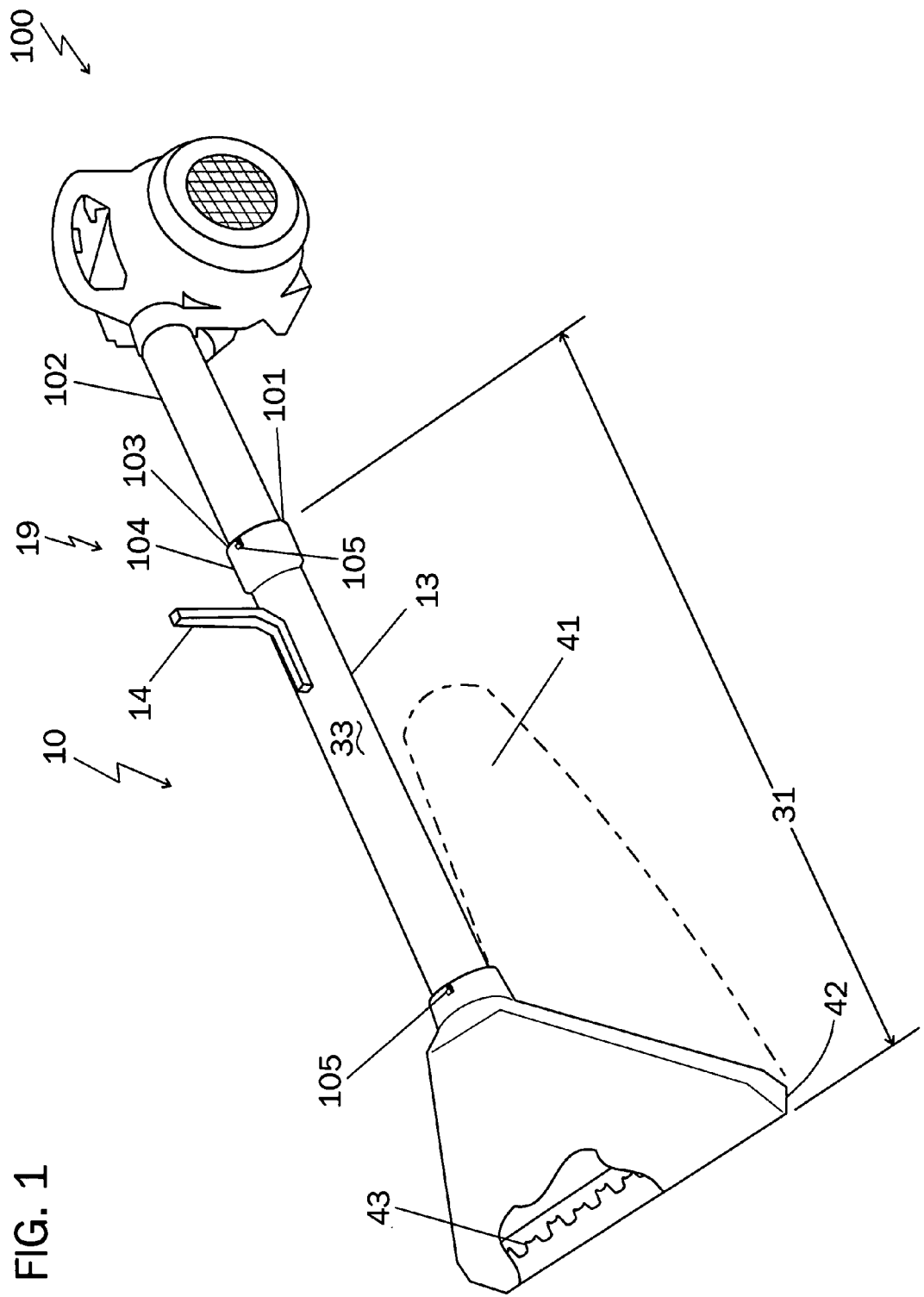
FIG. 1 is a perspective view of the raking attachment of this invention attached to an air stream generating device.
Figure 2:
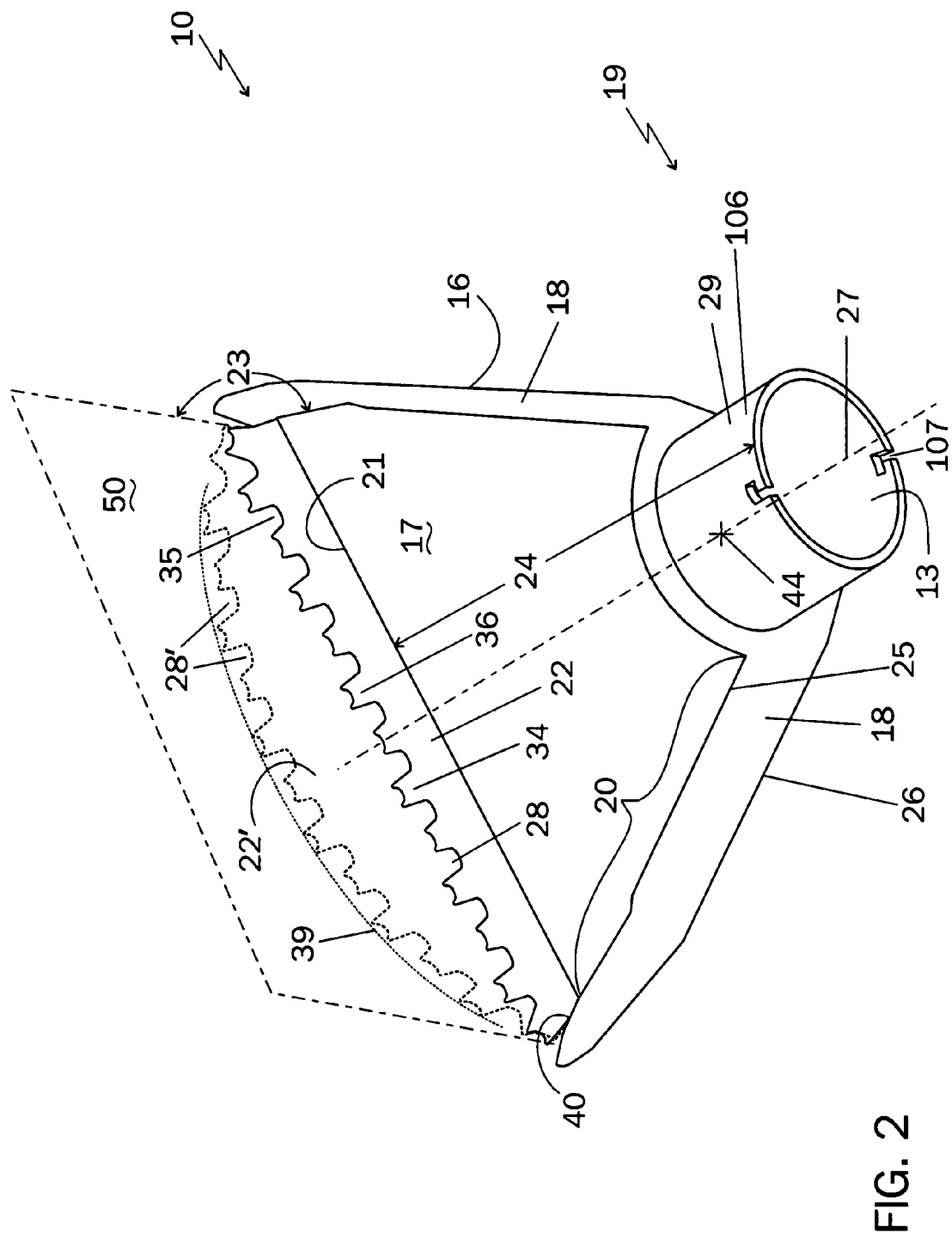
FIG. 2 is a perspective view of one preferred embodiment of the attachment of this invention in an inverted position to show the end wall, teeth and the bottom face.

Referring now to FIGS. 1 and 2, a raking attachment for an air stream generating device 100 is generally shown by the numeral 10. Raking attachment 10 is adapted to direct an air stream generated by air stream generating device 100 into a loosely defined plane 50 for directing lawn debris generally toward an operator of air stream generating device 100. Raking attachment 10 comprising a generally triangular shaped top wall 16, an opposing triangular shaped bottom face 17, side walls 18 and an inlet throat 19, side walls 18 joining at least a portion 20 of top wall 16 to bottom face 17, top wall 16, bottom face 17 and side walls 18 extending longitudinally from inlet throat 19. Top wall 16 extends beyond a terminal end 21 of bottom face 17, top wall 16 terminating in an end wall 22 that is disposed at an angle 23 relative to top wall 16 of raking attachment 10. Preferably, junctures 25 between top wall 16 and side walls 18 and likewise junctures 26 between side walls 18 and bottom face 17 are smooth contiguous arcs wherein junctures 25 and 26 comprise side walls 18, however, junctures 25 and 26 may be defined lines of demarcation such as square corners. It is preferred that bottom face 17 be joined to side walls 18 along the entire length 24 of bottom face 17, and in fact, it is most preferred that side walls 18, bottom face 17 and top wall 16 be integrally formed wherein at least one discharge port 28 is disposed between terminal end 21 and end wall 22. Side walls 18 may also extend along top wall 16 and be joined to end wall 22.

End wall 22 of raking attachment 10 may be substantially curved or straight with angle 23 preferably disposed at a right angle to top wall 16, end wall 22 directing air from air stream generating device 100 into loosely defined plane 50. Because of the angle at which air stream generating device 100 with raking attachment 10 releasably affixed thereto is held by an operator thereof, loosely defined plane 50 is then directed backwardly toward a foot of an operator of air stream generating device 100 thus facilitating clustering of debris such as dried leaves from deciduous trees. Of course, raking attachment 10 may be used to move other debris from a surface such as a lawn, walk, drive, floor, street or field. Though angle 23 is preferably a right angle, angle 23 may be an acute angle with respect to top wall 16 thus also changing loosely defined plane 50 to an acute angle. It should be readily apparent that an air stream, when directed downwardly and backwardly toward a foot of an operator, will readily dislodge debris from around trees, shrubs, plants or grass as well as dislodge material from alongside vertical surfaces such as walls, sidewalk edges, slabs, curbs or driveway edges into a form that can be controlled by the operator of the blower.

Figure 4:
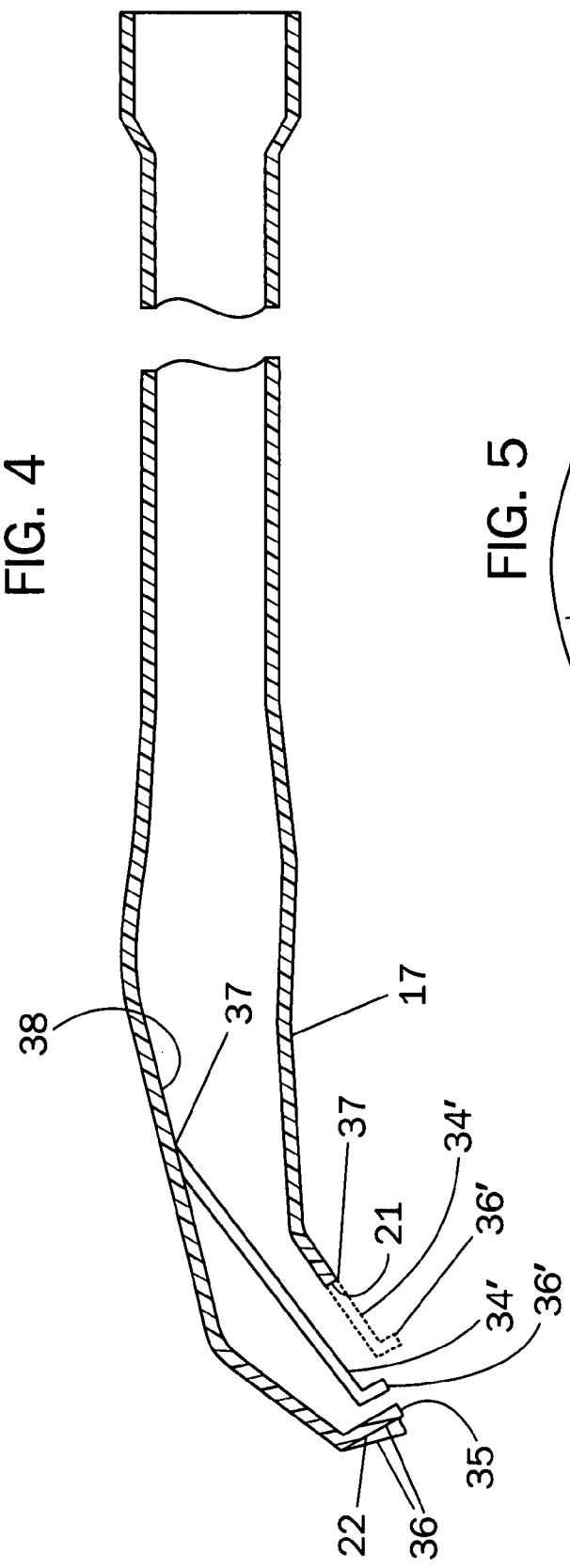
FIG. 4 is a section view of the preferred embodiment of the raking attachment of this invention showing attachment of protuberances such as spring form rake teeth.
Figure 5:
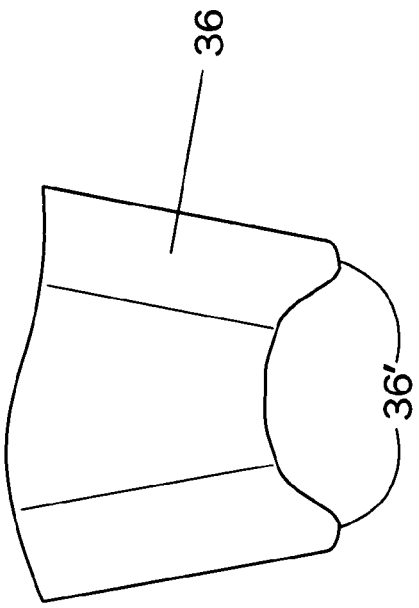
FIG. 5 is a greatly enlarged view of one tooth disposed on the end wall of the preferred embodiment of this invention.

Raking attachment 10 for an air stream generating device 100 has a plurality of spaced apart protuberances 34 disposed on a bottom edge 35 of end wall 22, protuberances 34 usable as rake teeth 36 to assist in dislodging debris from embedded locations. Teeth 36 may be substantially square with rounded spaced therebetween as shown in FIG. 2, however, any other shape for teeth 36 is fully within the scope of this invention. Teeth 36 are generally arranged in a single row on end wall 22, however, alternating teeth 36 are disposed at a greater curve or angle than adjacent teeth 36 to create loosely defined plane 50. By having alternating teeth 36 disposed at a greater curve than adjacent teeth 36, an air stream generated by air stream generating device 100 is not concentrated into a narrow line and thus the force of the air stream against the debris is better controlled by the operator. Though the figures show only alternating teeth disposed a different angles, it is fully within the scope of this invention to dispose every third or fourth ones of teeth 36 at different curves or angles to provide for loosely defined plane of desired configuration. It should also be readily apparent that although raking attachment 10 is preferably molded of a rigid thermoplastic and teeth 36 are effectively fixed in position, raking attachment 10 having teeth 36 made of a metallic material would lend teeth 36 to be bent to any configuration as desired by the operator. Furthermore, by having alternating teeth 36 disposed at different angles or curves from adjacent teeth 36, raking attachment 10 may be removably affixed to, and therefore usable with, air stream generating devices 100 having a greater air stream generating capacity without hindering the function of raking attachment 10. Additionally, each of teeth 36 may be further divided into minor teeth 36' as shown in FIG. 5, minor teeth 36' having any of a plurality of shapes, only one shown in FIG. 5. For instance, teeth 36 or 36' may be triangular, rectangular or rounded and may extend beyond bottom edge 35 of end wall 22 up to about 5 inches. In fact, as shown in FIG. 4, it is within the scope of this invention to provide teeth 36 on a flexible protuberance 34' that has one end 37 affixed to an inside surface 38 of top wall 16 or has end 37 affixed to terminal end 21 of bottom face 17, flexible protuberances 34' extending outwardly from terminal end 21 and terminating in downwardly turned teeth 36 proximate end wall 22. Protuberances 34, 34' create discharge ports 28 therebetween whether protuberances 34 are disposed on terminal wall 22 or extend like spring form rake like protuberances 34'.

Inlet throat 19 of raking attachment 10 may have an extended length 31 as best shown in FIG. 1, inlet throat 19 and extended length 31 constitute a plenum 13, plenum 13 having a substantially constant, preferably circular, cross section consonant with consumer and commercial air stream generating devices 100. Inlet throat 19 may be telescopically received on a slightly tapered end 101 of an extension tube (not shown) removably affixed to and extending from air stream generating device 100, or may be telescopically received directly on a slightly tapered end 103 of a discharge end 101 of a discharge tube 102 as is common with most air stream generating device 100. It is, however, within the scope of this invention to provide inlet throat 19 with at least one "J" slot 107 for locking collar 29 of inlet throat 19 to a post 105 on either the extension tube or discharge end 101. Alternately, post 105 may be disposed on an exterior surface 106 of locking collar 29 that is adapted to mate with a "J" slot 107 on one end of the extension tube or end 103 of air stream generating device 100 though end 103 would fit over exterior surface 106. Though only discharge tube 102 is shown in FIG. 1, the use of one or more than one extension tube removably affixed between discharge tube 102 and raking attachment 10 is fully within the scope of this invention and may be particularly useful for extended reaching is required. It is also within the scope of this invention to provide an adaptor 104 which is used to reduce the diameter of discharge port 101 of discharge tube 102 of larger diameter air generating devices 100 to the diameter of inlet throat 19, thus making raking attachment useful on commercial and home use air generating devices 100. Multiple adaptors 104 may be provided to adapt various sizes of discharge ports 101 to raking attachment 10 and, in fact, it is possible that the shape of adaptor 104 may be altered to conform to the shape of a particular discharge port 101, such as square, round or oval.

Raking attachment 10 preferably has a handle 14, generally shown as a "L", detachably disposed on a surface 33 of plenum 13 generally opposite bottom face 17, handle 14 providing assistance in retaining inlet throat 19 upon slightly tapered end 103 of discharge end 101 or a slightly tapered end of an extension tube, while providing maneuvering support of raking attachment 10 to the operator. Preferably, however, handle 14 is removably affixed to discharge tube 102 in a manner well known in the art, handle 14 disposed approximately midway between air stream generating device 100 and discharge end 101 as is comfortable for the operator. Using handle 14, the operator may move raking attachment 10 in any combination of the six orthogonal directions in order to maneuver end wall 22 into position beyond any debris and by using handle 14 to slightly rotate air generating device 100 back and forth along with raking attachment 10 about longitudinal axis 27, the operator may easily move the debris into a closely managed pile at, or near, at least one foot. The operator may also translate right or left, and/or backwardly to move a debris pile along a path as desired by the operator. It should be readily apparent that the operator may accumulate several piles of debris into a single general location by gently waggling air generating device 100 while moving one pile of debris toward a single general location. As handle 14 is detachably disposed onto discharge tube 102, handle 14 may be moved longitudinally along discharge tube 102 to provide for use by taller or shorter operators or as desired by the operator. Though raking attachment 10 preferably has handle 14 detachably disposed on discharge tube 102, handle 14 may be integrally formed with discharge tube 102 in a position generally opposite bottom face 17 of raking attachment 10. Additionally, though handle 14 is shown as "L" shaped, it is fully within the scope of this invention to provide a loop handle, ie suitcase handle, hook handle or another ergonomically designed handle disposed either longitudinally along plenum 13 or transverse thereto. Handle 14, when removably affixed to plenum 13, may be associated with plenum 13 by means well known in the art. In addition to handle 14, a shoulder strap, not shown, may be attached to discharge tube 102 of air stream generating device 100 and to raking attachment 10 to provide for further support and control of raking attachment 10.

Raking attachment 10 for an air stream generating device 100 has a plurality of spaced apart protuberances 34 disposed on a bottom edge 35 of end wall 22, protuberances 34 usable as rake teeth 36 to assist in dislodging debris from embedded locations. Teeth 36 may be generally squared off as shown in FIG. 2, however, any other shape is within the scope of this invention. Additionally, each of teeth 36 may be further divided into minor teeth 36' as shown in FIG. 5, minor teeth 36' having any of a plurality of shapes only one shown in FIG. 5. For instance, teeth 36 or 36' may be triangular, rectangular or rounded and may extend beyond bottom edge 35 of end wall 22 up to about 5 inches. In fact, as shown in FIG. 4, it is within the scope of this invention to provide teeth 36 on a flexible protuberance 34' that has one end 37 affixed to an inside surface 38 of top wall 16 or has end 37 affixed to terminal end 21 of bottom face 17, flexible protuberances 34' extending outwardly from terminal end 21 and terminating in downwardly turned teeth 36 proximate end wall 22. Protuberances 34, 34' create discharge ports 28 therebetween whether protuberances 34 are disposed on terminal wall 22 or extend like spring form rake like protuberances 34'. With teeth 36 alternately offset relative to each other as shown in FIGS. 2 and 4, the air discharged from discharge ports 28 has differing characteristics while maintaining mechanical action of teeth 36.

Raking attachment 10 for air stream generating device 100 may alternately have end wall 22 as a compound curved end wall 22' as in FIG. 2, compound curved end wall 22' directing air from air stream generating device 100 into an inwardly curved plane 41 extending below compound curved end wall 22'. Compound curved end wall 22' comprises a first arc 39 disposed laterally with respect to longitudinal axis 27 of plenum 13, first arc 39 shown in dashed lines in FIG. 2 and a second arc 40 disposed downwardly from top wall 16. First arc 39 preferably has a center point 44 lying on longitudinal axis 27 disposed through inlet throat 19, longitudinal axis 27 centrally located in top wall 16 thus bisecting raking attachment 10, however, it is within the scope of this invention to dispose center point 44 either right or left of longitudinal axis 27 such that raking attachment 10 has a greater tendency to direct an air stream to the right if center point 44 is disposed left of longitudinal axis 27 and right if center point 44 is disposed left of longitudinal axis 27 such that raking attachment 10 is then either right or left handed. First arc 39 preferably has an arc length of between 5 inches and 25 inches while second arc 40 preferably has a radius of about one inch with second arc 40 tangent to top wall 16. Since side walls 18 preferably extend the entire length of both bottom face 17 and top wall 16, an air stream generated by air stream generating device 100 is carefully directed into a defined inwardly curved plane 41 of finite width at raking attachment 10 tapering toward operator away from raking attachment 10 such that the air stream generated by air stream generating device 100 may readily be controlled by the operator of air stream generating device 100. It has been found by the inventor hereof that second arc 40 may be of varying radius from longitudinal axis 27 to ends 42, 43 of to alter the air flow characteristics of the air stream generated by air stream generating device 100, however, it has also been found that manufacturing of a variable second arc 40 increases costs of raking attachment 10. It is intuitive here, that compound curved end wall 22' directs the air stream generated by air stream generating device 100 into inwardly curved plane 41, inwardly curved plane 41 directed inwardly and backwardly toward at least one foot of an operator of air stream generating device 100.

Figure 3:
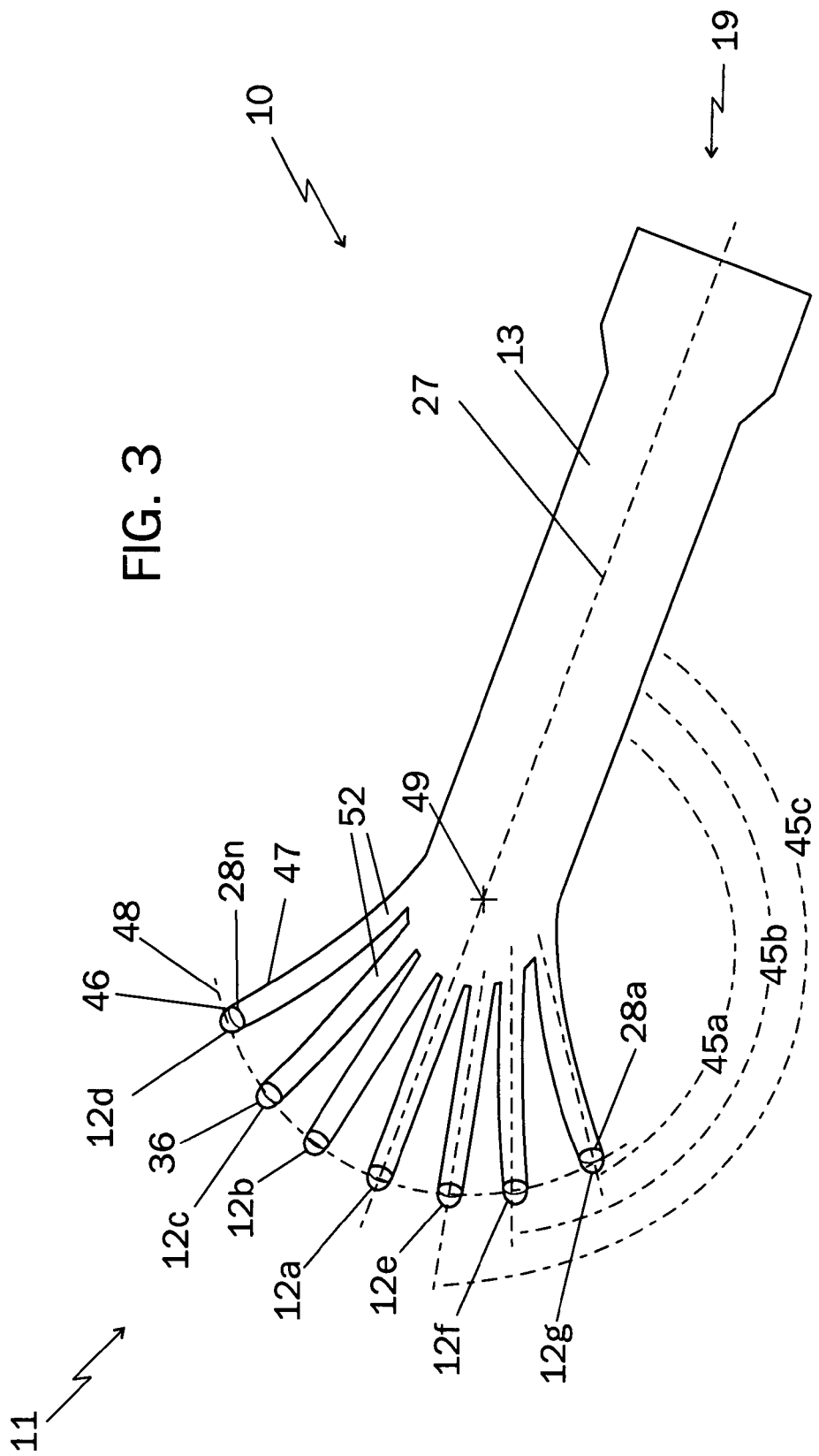
FIG. 3 is a bottom perspective view of an alternate embodiment of the attachment of this invention showing the spread shape of a plurality of spaced apart nozzles.

In an alternate embodiment shown in FIG. 3, raking attachment 10 for an air stream generating device 100 comprises a plurality 11 of nozzles 12a-12n for directing an air stream generated by air stream generating device 100 through discharge tube 102 of air stream generating device 100 continuing through a plenum 13 of raking attachment 10, the air stream further directed through plurality 11 of nozzles 12a-12n, nozzles 12a-12n having separate discharge ports 28. Nozzles 12a-12n are joined together at a common inlet throat 19 of raking attachment 10, inlet throat 19 of raking attachment 10 may be removably attached to a discharge end 101 of discharge tube 102, however, preferably nozzles 12a-12n are separated from inlet throat 19 by plenum 13 integral formed therewith wherein inlet throat 19 may be attached directly to a discharge port 101 of air stream generating device 100 or to an extension tube extending from air stream generating device 100. Plurality 11 of nozzles 12a-12n project from plenum 13 at different angles 45a-45n but as nozzles 12a-12n curve downwardly and backwardly, nozzles 12a-12n are converging relative to common inlet throat 19, plurality 11 of nozzles 12a-12n thus dividing the air stream into a plurality of air streams wherein discharge ports 28 of nozzles 12a-12n are directed in an inwardly disposed manner similar to inwardly curved plane 41 disposed at an angle relative to a longitudinal axis 27 of plenum 13 of raking attachment 10 for air generating device 100. In this alternate embodiment, raking attachment 10 may be compared to a human hand with fingers curved inwardly toward the palm where it becomes readily apparent that nozzles 12a-12n would direct the air stream inwardly and backwardly. Plurality 11 of nozzles 12a-12n each preferably have a protuberance 34 formed from a portion 46 of a wall 47 of nozzles 12a-12n, protuberances 34 useful as teeth 36 for dislodging material deeply embedded in the substrate being cleaned.

Raking attachment 10 for air stream generating device 100 of this alternate embodiment preferably has discharge ports 28a-28n of nozzles 12a-12n disposed on an arc 48 having a center point 49 on longitudinal axis 27 of plenum 13. Preferably, discharge ports 28a-28n of nozzles 12a-12n are from one-half to two inches in diameter and thus the spacing of nozzles 12a-12n is dictated by the number of nozzles 12a-12n and the selected diameter of discharge ports 28a-28n. Though one central nozzle 12a and six angled nozzles 12b-12g are shown in FIG. 3, any number of nozzles 12a-12n may be used whether an odd number with a centrally disposed nozzle 12a or an even number without a central nozzle. Nozzles 12a-12n shown in FIG. 3 are disposed at angle 23 with respect to longitudinal axis 27 of raking attachment 10, however, it is within the scope of this invention to disposed nozzles 12a-12n at angle 23 of less than ninety degrees as the operator will hold air generating device 100 with raking attachment 10 appended thereto at an angle of at least 20 degrees relative to the surface to be cleaned thus automatically directing discharge ports 28a-28n inwardly and backwardly toward the operator of air stream generating device 100 if angle 23 is greater than 70 degrees with respect to longitudinal axis 27.

Raking attachment 10 is preferably molded from a rigid elastomeric material which may be selected from the group consisting of polytetrafluoroethylene, polypropylene, polyethylene, polyamide, polyparabenzamide, silicone, viton, chloroprene, ethylene propylene polymer, isoprene, butyl, polystyrene, thermoplastic elastomer such as a fluoroelastomer, urethane, halogenated polymer, polypropylene, polyethylene, HDPE, LDPE, or combinations thereof. Any of the above elastomeric materials may also have a strengthening material incorporated therein such as carbon, glass, synthetic, natural fiber or combinations thereof. Though a rigid thermoplastic material is preferred, raking attachment 10 of FIG. 1 may alternately be made of a lightweight metal having top wall 16, side walls 18 and bottom face 17 joined together at junctures 25, 26. Similarly, alternate raking attachment 10 of FIG. 3 may be made by welding a plurality of curved tubes 52 to plenum 13, disposing tubes 52 at angles 45a-45n from plenum 13. Teeth 36 may then be formed on protuberances 34 in any manner well known in the art. In fact, it is within the scope of this invention to provide a replaceable element for teeth 36, the replaceable element removably affixed to bottom edge 35 of end wall 22.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

I claim:

1. A raking attachment for an air stream generating device adapted to direct an air stream generated by said air stream generating device into a plane comprises a triangular shaped top wall, an opposing triangular shaped bottom face, side walls and an inlet throat, said side walls joining at least a portion of said top wall to said bottom face, said top wall, said bottom face and said side walls extending longitudinally from said inlet throat, said top wall extending beyond a terminal end of said bottom face, said top wall terminating in an end wall, said end wall disposed at a angle relative to said top wall of said raking attachment said end wall is substantially straight and disposed at a right angle to said top wall, said end wall directing air from said air stream generating device into a plane wherein said plane is directed backwardly toward a foot of an operator of said air stream generating device.

2. A raking attachment for an air stream generating device as in claim 1 wherein said inlet throat is telescopically received in a plenum extending from said air stream generating device said plenum having a substantially constant cross section.

3. A raking attachment for an air stream generating device as in claim 2 wherein a handle is detachably disposed on a surface of said plenum opposite said end wall.

4. A raking attachment for an air stream generating device as in claim 1 wherein said inlet throat is extended along said longitudinal axis, said extension of said inlet throat having a substantially constant cross section thus constituting a plenum.

5. A raking attachment for an air stream generating device as in claim 4 wherein a handle is disposed on a surface of said plenum opposite said end wall.

6. A raking attachment for an air stream generating device as in claim 5 wherein said handle is integrally formed with said plenum.

7. A raking attachment for an air stream generating device adapted to direct an air stream generated by said air stream generating device into a plane comprises a triangular shaped top wall, an opposing triangular shaped bottom face, side walls and an inlet throat, said side walls joining at least a portion of said top wall to said bottom face, said top wall, said bottom face and said side walls extending longitudinally from said inlet throat, said top wall extending beyond a terminal end of said bottom face, said top wall terminating in an end wall, said end wall disposed at a angle relative to said top wall of said raking attachment wherein said end wall is a compound curved end wall, said compound curved end wall is a first arc disposed laterally with respect to said axis of said plenum and a second arc disposed downwardly from said top wall, said compound curved end wall directing air from said air stream generating device into a curved plane.

8. A raking attachment for an air stream generating device as in claim 7 wherein said plane is directed inwardly and backwardly toward at least one foot of an operator of said air stream generating device.

9. A raking attachment for an air stream generating device as in claim 8 wherein said inlet throat is telescopically received in a plenum extending from said air stream generating device said plenum having a substantially constant cross section.

10. A raking attachment for an air stream generating device as in claim 9 wherein a handle is detachably disposed on a surface of said plenum opposite said bottom face.

11. A raking attachment for an air stream generating device as in claim 10 wherein said inlet throat is extended along said longitudinal axis, said extension of said inlet throat having a substantially constant cross section thus constituting a plenum.

12. A raking attachment for an air stream generating device as in claim 9 wherein a handle is disposed on a surface of said plenum opposite said bottom face.

13. A raking attachment for an air stream generating device as in claim 12 wherein said handle is integrally formed with said plenum.

14. A raking attachment for an air stream generating device as in claim 7 wherein said first arc has a center point lying on a longitudinal axis disposed through said inlet throat, said longitudinal axis centrally located in said top wall.

15. A raking attachment for an air stream generating device as in claim 14 wherein said first arc has an arc length of between 5 inches and 25 inches.

16. A raking attachment for an air stream generating device as in claim 7 wherein said second arc is tangent to said top wall.

17. A raking attachment for an air stream generating device as in claim 9 wherein said air raking attachment is separable from said plenum.

* * * * *